(12) United States Patent
Ayukawa

(10) Patent No.: US 10,800,459 B2
(45) Date of Patent: Oct. 13, 2020

(54) VEHICLE SIDE PORTION STRUCTURE

(71) Applicant: TOYOTA JIDOSHA KABUSHIKI KAISHA, Toyota-shi (JP)

(72) Inventor: Tatsuya Ayukawa, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 65 days.

(21) Appl. No.: 15/992,491

(22) Filed: May 30, 2018

(65) Prior Publication Data
US 2019/0031241 A1 Jan. 31, 2019

(30) Foreign Application Priority Data

Jul. 25, 2017 (JP) .................................. 2017-143692

(51) Int. Cl.
*B62D 21/15* (2006.01)
*B60L 50/60* (2019.01)
(Continued)

(52) U.S. Cl.
CPC .......... *B62D 21/157* (2013.01); *B60J 5/0427* (2013.01); *B60J 5/0438* (2013.01); *B60J 5/0456* (2013.01);
(Continued)

(58) Field of Classification Search
CPC ....... B62D 21/157; B62D 25/20; B60L 50/66; B60J 5/0456; B60J 5/0427; B60J 5/0438;
(Continued)

(56) References Cited

U.S. PATENT DOCUMENTS 4,174,014 A * 11/1979 Bjorksten ................ B60K 1/04
180/68.5
5,704,644 A 1/1998 Jaggi
(Continued)

FOREIGN PATENT DOCUMENTS

DE 10 2010 050 826 A1 5/2012
GB 2 280 647 A 2/1995
(Continued)

OTHER PUBLICATIONS

Extended European Search Report dated Nov. 23, 2018 in Patent Application No. 18176854.0, 8 pages.

*Primary Examiner* — Darlene P Condra
(74) *Attorney, Agent, or Firm* — Oblon, McClelland, Maier & Neustadt, L.L.P.

(57) ABSTRACT

A vehicle side portion structure that includes: a pair of rockers that, at vehicle side portions, respectively extend along a vehicle longitudinal direction at both outer sides in a vehicle transverse direction of a floor panel that is a floor portion of a vehicle cabin interior, first impact absorbing portions that form closed cross-sectional structures and that, at a time of a side collision of a vehicle, plastically deform and absorb collision energy being provided at interiors of the pair of rockers; and side doors that open and close door opening portions of the vehicle side portions, second impact absorbing portions, which form closed cross-sectional structures and, at the time of a side collision of the vehicle, plastically deform and absorb collision energy, being provided at lower portions of interiors of the side doors.

4 Claims, 8 Drawing Sheets

(51) Int. Cl.
   *B60J 5/04*     (2006.01)
   *B60K 1/04*     (2019.01)

(52) U.S. Cl.
   CPC ............... *B60K 1/04* (2013.01); *B60L 50/66* (2019.02); *B60K 2001/0438* (2013.01); *B60K 2001/0472* (2013.01); *B60Y 2306/01* (2013.01)

(58) Field of Classification Search
   CPC .. B60J 5/0461; B60K 1/04; B60K 2001/0438; B60K 2001/0472; B60Y 2306/01
   See application file for complete search history.

(56) References Cited

U.S. PATENT DOCUMENTS

| | | | |
|---|---|---|---|
| 9,346,346 B2* | 5/2016 | Murray | B60K 1/04 |
| 9,493,190 B1* | 11/2016 | Alwan | B62D 21/157 |
| 9,579,963 B2* | 2/2017 | Landgraf | B60K 1/04 |
| 2013/0270864 A1* | 10/2013 | Young | B60K 1/04 |
| | | | 296/187.12 |
| 2015/0174996 A1* | 6/2015 | Ikeda | B60K 1/04 |
| | | | 180/68.5 |
| 2016/0083017 A1* | 3/2016 | Sakaguchi | B62D 21/157 |
| | | | 296/187.12 |
| 2016/0114667 A1* | 4/2016 | Ikeda | B60K 1/04 |
| | | | 180/68.5 |

FOREIGN PATENT DOCUMENTS

| | | |
|---|---|---|
| JP | 3180503 | 6/2001 |
| JP | 3403276 | 5/2003 |
| JP | 5095285 | 12/2012 |
| WO | WO 2010/007269 A1 | 1/2010 |

* cited by examiner

VEHICLE SIDE PORTION STRUCTURE

CROSS-REFERENCE TO RELATED APPLICATION

This application is based on and claims priority under 35 USC 119 from Japanese Patent Application No. 2017-143692 filed on Jul. 25, 2017, which is incorporated by reference herein.

BACKGROUND

Technical Field

The present disclosure relates to a vehicle side portion structure.

Related Art

Japanese Patent No. 3180503 discloses a technique in which, in an impact absorbing structure of a vehicle side portion, a side frame is disposed along the vehicle longitudinal direction at the lower side of the floor panel, and an energy absorbing member (hereinafter called "impact absorbing member" is provided at the side surface portion, which faces the vehicle outer side, of this side frame.

In this technique, side sills (hereinafter called "rockers") are disposed along the vehicle longitudinal direction at the vehicle transverse direction both edge portions of the floor panel, and side doors are provided at the upper sides of the rockers. The vehicle side portions are structured by the side doors and the rockers. The impact absorbing members extend along the horizontal direction from the side surface portions of the side frames to the same vertical planes as the vehicle side portions.

Therefore, when a colliding member (hereinafter called "barrier") collides with a vehicle side portion, impact energy is absorbed by this impact absorbing member, and the collision load that is inputted to the vehicle side portion is dispersed toward the vehicle upper and lower sides including to the side door and the rocker.

On the other hand, Japanese Patent No. 3403276 discloses a technique in which plural impact absorbing members that have different rigidities are provided at the interior of a side door along the vehicle transverse direction. Further, Japanese Patent No. 5095285 discloses a technique in which, at the interior of a side door, a resin panel is provided between the door outer panel and the door trim, and load receiving portions are provided respectively at the door outer panel side and the door trim side of the resin panel.

Namely, in the techniques disclosed in Japanese Patent No. 3403276 and Japanese Patent No. 5095285, impact absorbing members are provided at the interior of the side door, and, when a barrier collides with the vehicle side portion, due to deformation (plastic deformation) of the side door, the impact absorbing members deform, and impact energy can be absorbed.

As described above, in these techniques, by providing impact absorbing members at a vehicle side portion, impact energy is absorbed by the impact absorbing members at the time of a side collision of the vehicle (hereinafter called "the time of a vehicle side collision"). When impact energy is absorbed in this way, the penetration speed of the barrier in toward the vehicle transverse direction inner side is slowed.

However, in these techniques, in a case in which a barrier collides with the lower portion of the side door at the time of a vehicle side collision, there are cases in which, until the lower portion of the side door hits the rocker, there is so-called idle time in which the impact absorbing members do not deform. Therefore, there is the possibility that a stroke that is sufficient enough to absorb the impact energy cannot be ensured.

SUMMARY

An aspect of a vehicle side portion structure includes: a pair of rockers that, at vehicle side portions, respectively extend along a vehicle longitudinal direction at both outer sides in a vehicle transverse direction of a floor panel that is a floor portion of a vehicle cabin interior, first impact absorbing portions that form closed cross-sectional structures and that, at a time of a side collision of a vehicle, plastically deform and absorb collision energy being provided at interiors of the pair of rockers; and side doors that open and close door opening portions of the vehicle side portions, second impact absorbing portions, which form closed cross-sectional structures and, at the time of a side collision of the vehicle, plastically deform and absorb collision energy, being provided at lower portions of interiors of the side doors.

DESCRIPTION OF EMBODIMENTS

Figure 1:
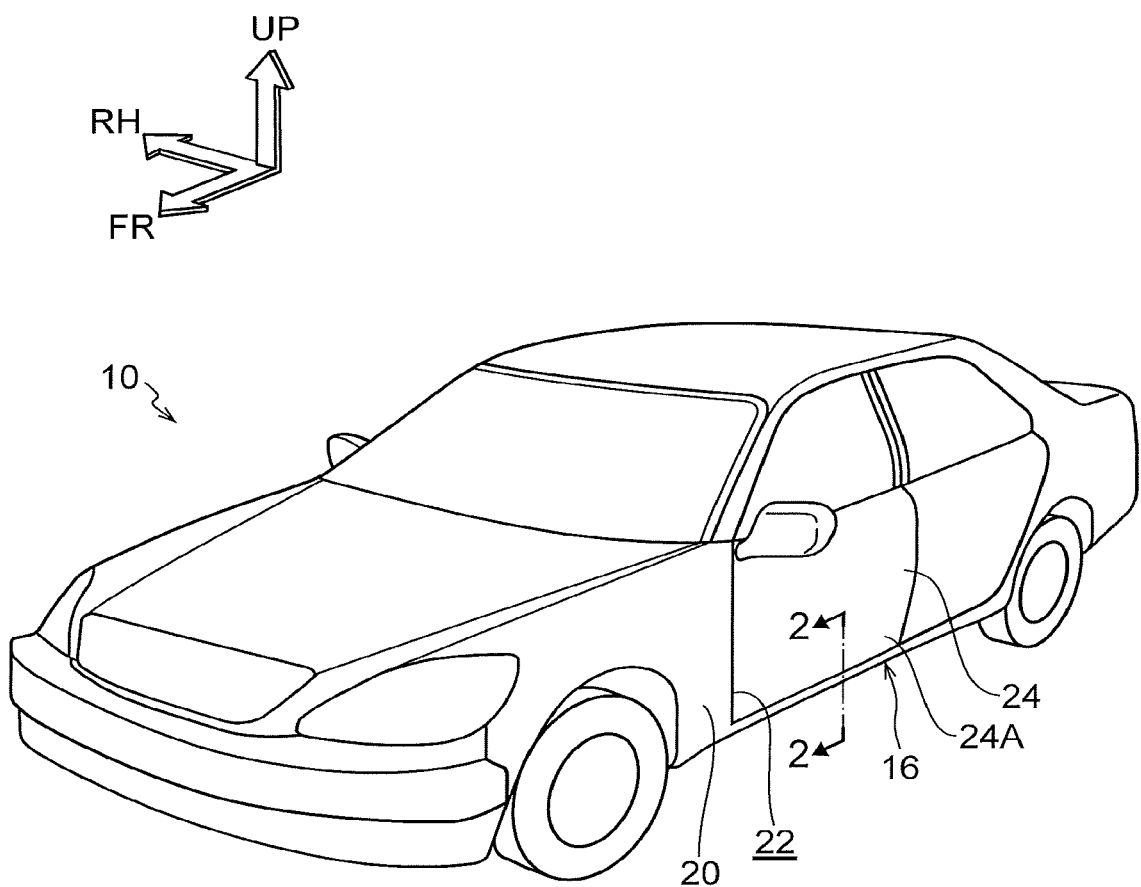
FIG. 1 is a perspective view in which a vehicle, to which a vehicle side portion structure relating to the present embodiment is applied, is seen from an obliquely front and left side.

An electric automobile (hereinafter simply called "vehicle"), to which a vehicle side portion structure relating to an embodiment of the present disclosure is applied, is described hereinafter by using the drawings. Note that arrow FR, arrow UP and arrow OUT that are marked appropriately in the respective drawings indicate the forward direction (the advancing direction), the upward direction and the rightward direction of the vehicle, respectively. Hereinafter, when merely longitudinal, left-right and vertical directions are used, they refer to the longitudinal of the vehicle longitudinal direction, the left and right of the vehicle left-right direction (the vehicle transverse direction) and the vertical of the vehicle vertical direction, unless otherwise indicated. Further, in the respective drawings, there are cases in which some of the reference numerals are omitted in order to make the drawing easy to understand.

Structure of Vehicle Side Portion Structure

A sedan type vehicle is illustrated in FIG. 1 as an example of a vehicle 10 to which the vehicle side portion structure relating to the present embodiment is applied. Further, a plan view, which shows a floor panel 14 and rockers 18 of the vehicle 10, is shown in FIG. 3.

Figure 3:
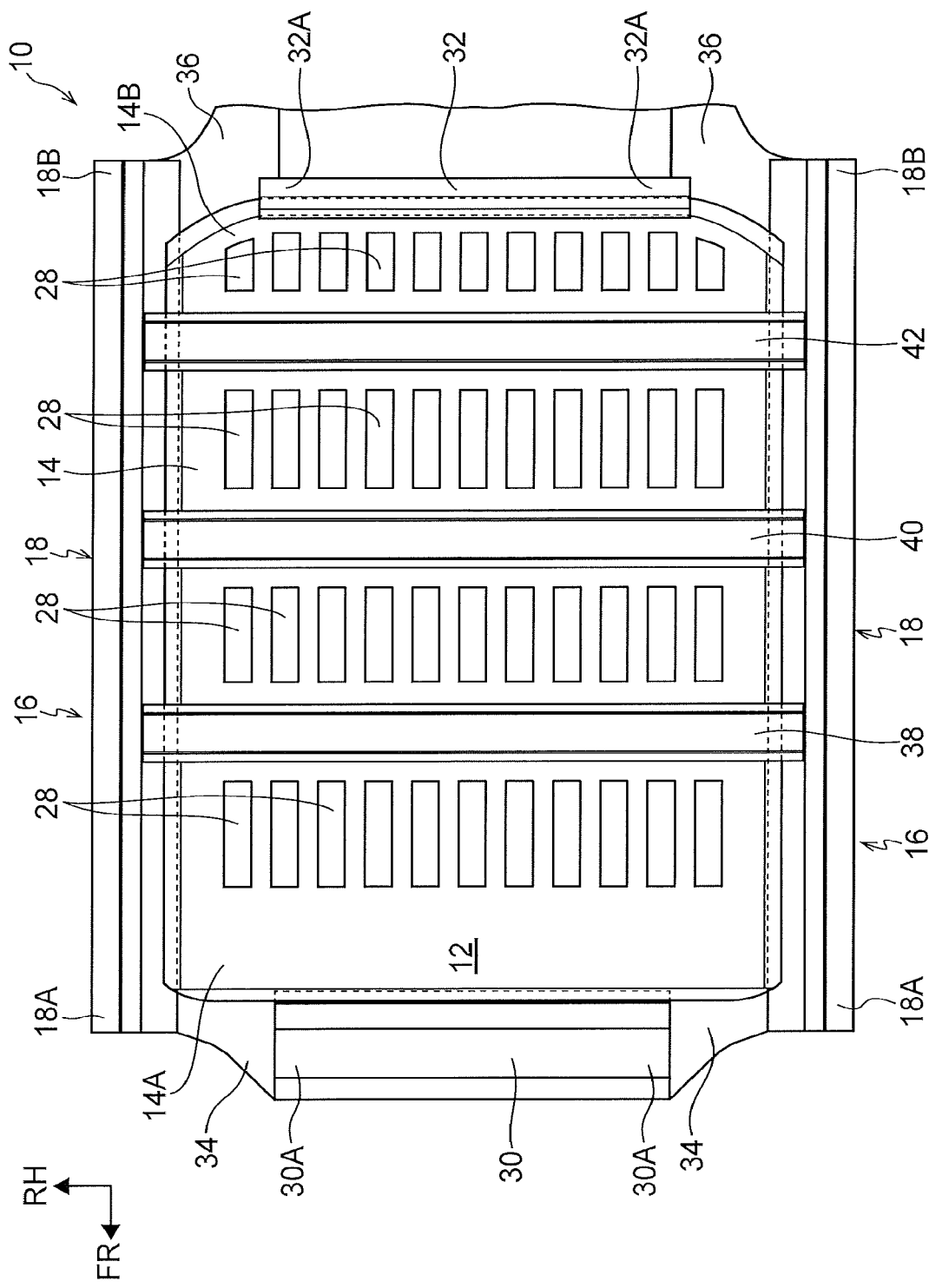
FIG. 3 is a plan view showing a floor panel and rockers of the vehicle to which the vehicle side portion structure relating to the present embodiment is applied.

As shown in FIG. 3, the floor panel 14, which structures the floor portion of a vehicle cabin 12, is provided at the vehicle 10 so as to extend along the vehicle transverse direction and the vehicle longitudinal direction. At vehicle side portions 16, the rockers 18 respectively extend along the vehicle longitudinal direction at the vehicle transverse direction both outer sides of the floor panel 14.

Figure 4:
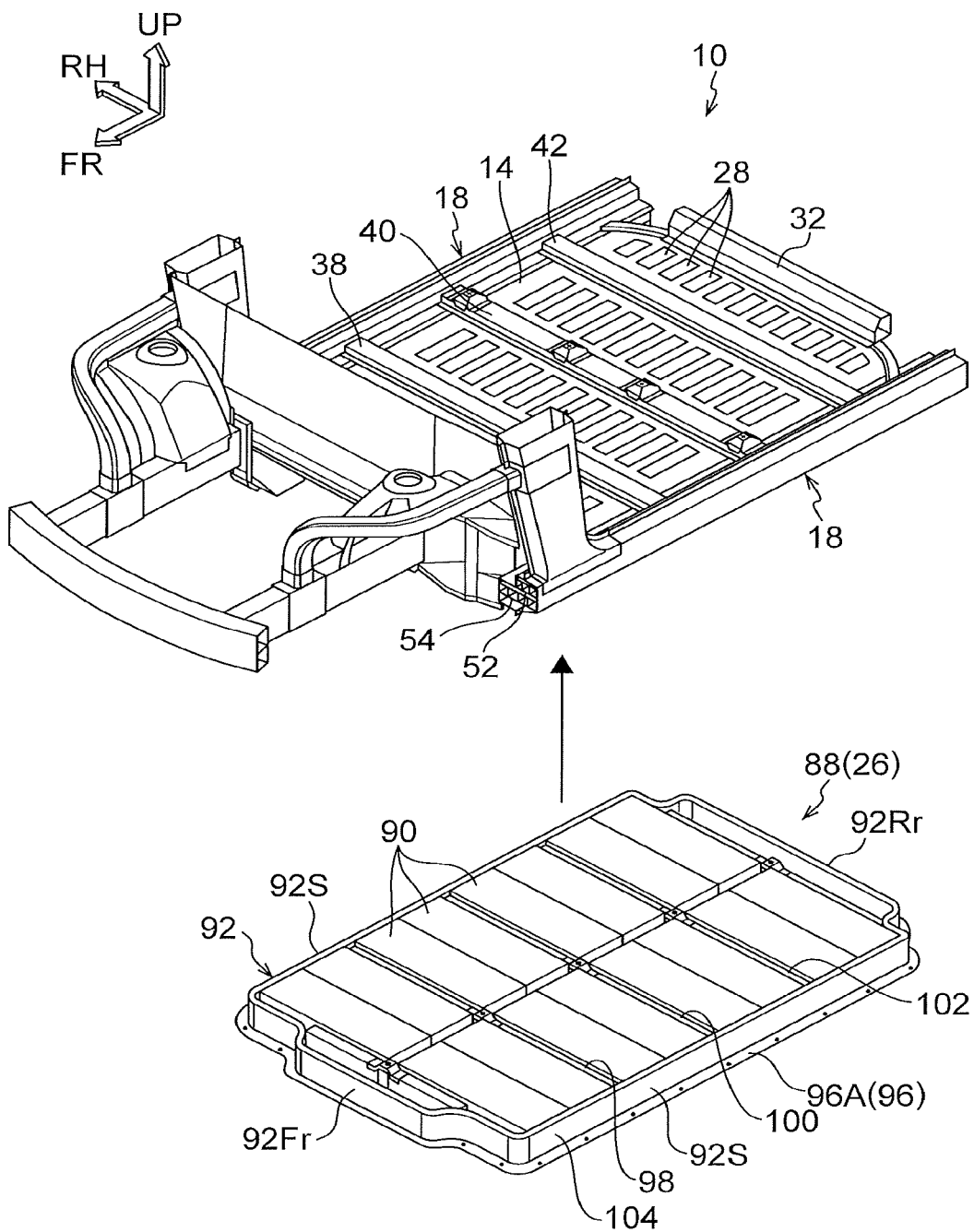
FIG. 4 is an exploded perspective view showing the structure of the lower portion of the vehicle to which the vehicle side portion structure relating to the present embodiment is applied.

Further, as shown in FIG. 1, a side member outer panel 20 that structures the design surface is provided at the vehicle side portion 16. A door opening portion 22 is formed in the vehicle longitudinal direction central portion of the side member outer panel 20. A side door 24 is provided at the door opening portion 22 so as to be able to open and close. Further, as shown in FIG. 4, at the vehicle 10, a battery pack 26 is installed at the lower side of the floor panel 14. Note that FIG. 4 is an exploded perspective view showing the vehicle body structure of the vehicle 10 that is illustrated in FIG. 1.

Hereinafter, the structures of the floor panel 14, the rockers 18, the side doors 24 and the battery pack 26 will be described in that order. Thereafter, main portions of the vehicle side portion structure relating to the present embodiment will be described.

Structure of Floor Panel

As shown in FIG. 3, bead portions 28 which are substantially rectangular as seen in plan view are provided at the floor panel 14 so as to project-out intermittently along the vehicle longitudinal direction. The plural bead portions 28 are arrayed along the vehicle transverse direction. The rigidity of the floor panel 14 itself improves due to these bead portions 28 being formed.

Further, as described above, the rockers 18 respectively extend along the vehicle longitudinal direction, at the vehicle transverse direction both outer sides of the floor panel 14. Moreover, a front cross member 30 extends along the vehicle transverse direction at a front end portion 14A of the floor panel 14. A rear cross member 32 extends along the vehicle transverse direction at a rear end portion 14B of the floor panel 14.

Further, connecting members 34 are respectively connected to both end portions 30A of the front cross member 30. The front cross member 30 is connected to respective front end portions 18A of the rockers 18 via the connecting members 34. Connecting members 36 are respectively connected to both end portions 32A of the rear cross member 32. The rear cross member 32 is connected to respective rear end portions 18B of the rockers 18 via the connecting members 36.

Note that the connecting members 34, 36 are not necessarily needed, and the front cross member 30 and the rear cross member 32 may be formed such that the both end portions 30A of the front cross member 30 and the both end portions 32A of the rear cross member 32 are directly connected to the rockers 18.

Plural floor cross members 38, 40, 42 span along the vehicle transverse direction between the rocker 18 and the rocker 18 in the vehicle transverse direction and between the front cross member 30 and the rear cross member 32 in the vehicle longitudinal direction. Note that the floor cross members 38, 40, 42 are disposed at a predetermined interval in the vehicle longitudinal direction. The bead portions 28 are formed so as to not interfere with these floor cross members 38, 40, 42, and the like.

Structure of Rocker

Figure 2:
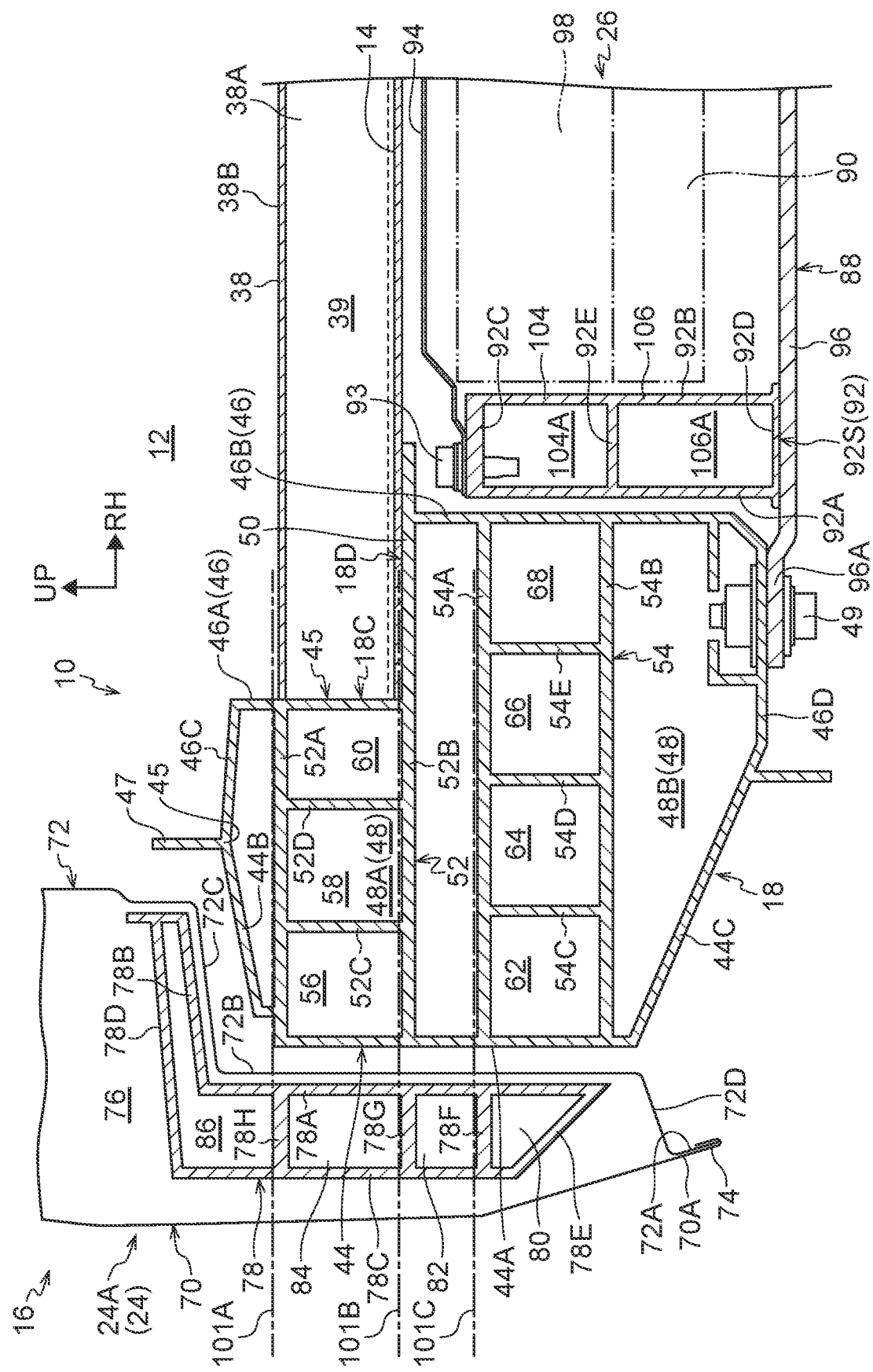
FIG. 2 is an enlarged sectional view showing, in an enlarged manner, the cross-section cut along line 2-2 of FIG. 1.

An enlarged cross-sectional view, in which the cross-section cut along line 2-2 of FIG. 1 is shown in an enlarged manner, is shown in FIG. 2. As shown in FIG. 2, the rocker 18 is structured to include an outer portion 44 that is positioned at the vehicle transverse direction outer side, and an inner portion 45 that is positioned at the vehicle transverse direction inner side. The rocker 18 is formed of a metal such as an aluminum alloy or the like for example. The outer portion 44 and the inner portion 45 are formed integrally by extrusion or drawing or the like, and a closed cross-sectional portion 48 is formed by the outer portion 44 and the inner portion 45.

In the cross-sectional shape that is cut along the vehicle transverse direction, the outer portion 44 is structured to include an outer wall portion 44A that is formed along the vertical direction, an inclined upper wall portion 44B that is provided at the upper side of the outer wall portion 44A and is inclined toward the upper side while heading toward the vehicle transverse direction inner side, and an inclined lower wall portion 44C that is provided at the lower side of the outer wall portion 44A and is inclined toward the lower side while heading toward the vehicle transverse direction inner side.

On the other hand, at the inner portion 45, in the cross-sectional shape that is cut along the vehicle transverse direction, an inner wall portion 46 that is formed along the vertical direction is structured to include an upper side inner wall portion 46A that is formed along the vertical direction at the upper portion side of the inner portion 45, and a lower side inner wall portion 46B that is formed along the vertical direction at the lower portion side of the inner portion 45. The lower side inner wall portion 46B is positioned further toward the vehicle transverse direction inner side than the upper side inner wall portion 46A. A lateral wall portion 50 that is formed substantially along the horizontal direction is provided between the lower side inner wall portion 46B and the upper side inner wall portion 46A.

An inclined upper wall portion 46C, which is inclined toward the upper side while heading toward the vehicle transverse direction outer side, is provided at the upper side of the upper side inner wall portion 46A. This inclined upper wall portion 46C is formed so as to be connected with the inclined upper wall portion 44B of the outer portion 44. Further, a flange portion 47 extends-out toward the upper side from a peak portion where the inclined upper wall portion 46C of the inner portion 45 and the inclined upper wall portion 44B of the outer portion 44 are connected. Note that the lower end portion of a pillar is joined to this flange portion 47.

A lower wall portion 46D, which is formed substantially along the horizontal direction toward the vehicle transverse direction outer side, is provided at the lower side of the lower side inner wall portion 46B. This lower wall portion 46D is formed so as to be connected to the inclined lower wall portion 44C of the outer portion 44. Note that fasteners 49 can be inserted-through the lower wall portion 46D. A joining flange 96A, which is provided at the battery pack 26 that is described later, can be fastened to the rocker 18 via these fasteners 49.

By the way, the lateral wall portion 50 connects the lower side inner wall portion 46B and the upper side inner wall portion 46A that are at different positions in the vehicle transverse direction. The inner wall portion 46 of the inner portion 45, including the lateral wall portion 50, is formed in the shape of a crank. Moreover, the lateral wall portion 50 extends to the outer wall portion 44A of the outer portion 44. The closed cross-sectional portion 48 that structures the interior of the rocker 18 is sectioned by the lateral wall portion 50 into an upper portion 48A and a lower portion 48B.

As described above, the upper side inner wall portion 46A of the inner portion 45 is positioned further toward the vehicle transverse direction outer side than the lower side inner wall portion 46B. Therefore, the surface areas of the closed cross-sectional portions differ at the upper portion 48A and the lower portion 48B of the closed cross-sectional portion 48. In the present embodiment, the sectional surface area of a lower portion 18D side of the rocker 18 is greater than the sectional surface area of an upper portion 18C side. Namely, the rigidity of the lower portion 18D side of the rocker 18 is higher than that of the upper portion 18C side of the rocker 18.

Moreover, an impact absorbing portion (a first impact absorbing portion) 52, which is shaped as a ladder and forms a closed cross-sectional structure, is provided within the upper portion 18C of the rocker 18. An impact absorbing portion (a first impact absorbing portion) 54, which is shaped as a ladder and forms a closed cross-sectional structure, is formed within the lower portion 18D of the rocker 18. At the time of a side collision of the vehicle 10, collision energy is absorbed due to these impact absorbing portions 52, 54 plastically deforming.

Structure of Side Door

As shown in FIG. 2, the side door 24 is structured to include a door outer panel 70 that is positioned at the vehicle transverse direction outer side, and a door inner panel (a door inner member) 72 that is positioned at the vehicle transverse direction inner side.

For example, the door outer panel 70 is formed by press-molding an aluminum alloy plate, and the door inner panel 72 is formed by press-molding a steel plate. Lightening of the weight of the side door 24 can be devised by forming the door outer panel 70 of an aluminum alloy plate whose specific gravity is lighter than that of a steel plate. On the other hand, by forming the door inner panel 72 of a steel plate, lowering of the cost, and ensuring of the strength and the cross-sectional rigidity of the side door 24, can be realized.

Further, an outer edge portion 70A of the door outer panel 70 and an outer edge portion 72A of the door inner panel 72 are joined together by hemming (hemmed portion 74). When the side door 24 is cut substantially along the horizontal direction, a closed cross-sectional portion 76 is formed. Note that, other than a metal material, the door inner panel 72 may be formed of a non-metal material such as a fiber reinforced resin material (FRP) for example. In this case, the door outer panel 70 and the door inner panel 72 are joined together by welding or adhesion or the like.

A lower portion 24A of the side door 24 faces the rocker 18 in the vehicle transverse direction, and the door inner panel 72 is formed along the shape of the outer portion 44 of the rocker 18. In detail, at the lower portion 24A of the side door 24, the door inner panel 72 is structured to include an inner wall portion 72B that is formed along the vertical direction and faces the outer wall portion 44A of the outer portion 44 of the rocker 18, and an eaves portion 72C that is bent toward the vehicle transverse direction inner side and substantially faces the inclined upper wall portion 44B of the outer portion 44 of the rocker 18.

Note that a lower wall portion 72D that is bent toward the vehicle transverse direction outer side is formed from the lower end of the inner wall portion 72B. The distal end portion of the lower wall portion 72D is, as the outer edge portion 72A of the door inner panel 72, joined to the outer edge portion 70A of the door outer panel 70, and is the hemmed portion 74.

Moreover, in the present embodiment, at the lower portion 24A of the side door 24, an impact absorbing portion (a second impact absorbing portion) 78, which is shaped as a ladder and forms a closed cross-sectional structure, is provided within the closed cross-sectional portion 76. This impact absorbing portion 78 is provided so as to overlap the impact absorbing portions 52, 54 of the rocker 18 as seen in a vehicle side view. At the time of a side collision of the vehicle 10, collision energy is absorbed due to this impact absorbing portion 78 plastically deforming.

Structure of Battery Pack

As shown in FIG. 2 and FIG. 4, the battery pack 26 has a battery case 88 that is formed in the shape of a box that is flat in the vehicle vertical direction and that is long in the vehicle longitudinal direction, and plural battery modules 90 that are accommodated at the interior of the battery case 88. The battery modules 90 are structured by plural square storage batteries.

On the other hand, the battery case 88 has a peripheral wall 92, a ceiling plate (a cover portion) 94 (not illustrated in FIG. 4), and a bottom plate 96. The peripheral wall 92 is formed by an extrusion molded product, that is elongated and is formed by extrusion molding of a light metal such as an aluminum alloy or the like for example, being bent in the shape of a rectangular frame, and the both length direction end portions thereof being joined together. In a plan view, the peripheral wall 92 is shaped as a rectangular frame.

As shown in FIG. 4, the peripheral wall 92 is structured to include a pair of left and right side wall portions 92S that face one another in the vehicle transverse direction, a front wall portion 92Fr that faces the vehicle longitudinal direction and connects the front ends of the pair of side wall portions 92S together, and a rear wall portion 92Rr that connects the rear ends of the pair of side wall portions 92S together. Moreover, cross members 98, 100, 102 span between the side wall portion 92S and the side wall portion 92S, at an upper portion 104 (see FIG. 2) side of the peripheral wall 92. These cross members 98, 100, 102 are disposed at a uniform interval between the front wall portion 92Fr and the rear wall portion 92Rr.

Further, as shown in FIG. 2, the cross-section seen from the peripheral direction (the length direction of the aforementioned extrusion molded product) of the peripheral wall 92 of the battery case 88 is formed in a substantial B-shape. Moreover, the peripheral wall 92 has an outer peripheral wall portion 92A that forms the outer peripheral surface of the peripheral wall 92, an inner peripheral wall portion 92B that forms the inner peripheral surface of the peripheral wall 92, an upper wall portion 92C that connects the upper end portions of the outer peripheral wall portion 92A and the inner peripheral wall portion 92B in the vehicle horizontal direction, a lower wall portion 92D that connects the lower end portions of the outer peripheral wall portion 92A and the inner peripheral wall portion 92B in the vehicle horizontal direction, and a partitioning wall portion 92E the connects the vertical direction intermediate portions of the outer peripheral wall portion 92A and the inner peripheral wall portion 92B in the vehicle horizontal direction. Due to this partitioning wall portion 92E, the peripheral wall is divided into the upper portion 104 and a lower portion 106, and is partitioned (sectioned) into an upper space 104A and a lower space 106A.

On the other hand, the ceiling plate 94 is formed by press molding a plate member that is formed from a light metal such as an aluminum alloy or the like for example, and is fixed to the top surface of the upper wall portion 92C of the peripheral wall 92 by plural bolts 93. Further, the bottom plate 96 is formed by press molding a plate member that is formed from a light metal such as an aluminum alloy or the like for example, and is fixed to the bottom surface of the lower wall portion 92D of the peripheral wall 92 by means such as welding, fixing by rivets, or the like. As shown in FIG. 4, the joining flange 96A, which juts-out further toward the vehicle outer sides in the vehicle horizontal direction than the peripheral wall 92, is provided at the bottom plate 96 over the entire periphery of the peripheral wall 92. Further, this joining flange 96A is fastened to (joined with) the left and right rockers 18 (see FIG. 2), and the battery case 88, i.e., the battery pack 26, is fixed to the rockers 18 in a state of being supported from the lower side by the bottom plate 96.

Main Portions of Vehicle Side Portion Structure Relating to Present Embodiment

In the present embodiment, as shown in FIG. 2, the impact absorbing portion (first impact absorbing portion) 52 is provided within the upper portion 48A of the closed cross-sectional portion 48 of the rocker 18, and the impact absorbing portion (first impact absorbing portion) 54 is provided within the lower portion 48B of the closed cross-sectional portion 48 of the rocker 18. Further, the impact absorbing portion (second impact absorbing portion) 78 is provided within the closed cross-sectional portion 76 at the lower portion 24A of the side door 24.

First, the structures of the impact absorbing portions 52, 54 that are provided within the rocker 18 are described in detail. These impact absorbing portions 52, 54 respectively are closed cross-sectional structures and are formed in the shapes of ladders, and are formed integrally with the outer portion 44 and the inner portion 45 of the rocker 18, respectively. Further, the impact absorbing portion 52 is provided so as to overlap the floor cross member 38 as seen in a vehicle side view, and the impact absorbing portion 54 is provided so as to overlap the battery pack 26 as seen in a vehicle side view.

The impact absorbing portion 52 is provided so as to overlap the floor cross members 38, 40, 42 (see FIG. 4) as seen in a vehicle side view. For example, when the floor cross member 38 is cut along the vehicle longitudinal direction, a closed cross-sectional portion 39 is formed, and the floor cross member 38 is structured to include side walls 38A that face one another, and an upper wall 38B that connects the upper ends of these side walls 38A together.

The impact absorbing portion 52 has an upper wall 52A that spans substantially in the horizontal direction between the upper side inner wall portion 46A of the inner portion 45 and the outer wall portion 44A of the outer portion 44. This upper wall 52A is provided so as to overlap the upper wall 38B of the floor cross member 38 as seen in a vehicle side view.

Moreover, at the impact absorbing portion 52, a lower wall 52B that faces the upper wall 52A is formed at the lower side of the upper wall 52A, and the lower wall 52B is connected to the lateral wall portion 50. Plural (here, two) connecting walls 52C, 52D span in the vertical direction between the upper wall 52A and the lower wall 52B. Small spaces 56, 58, 60 are provided at the impact absorbing portion 52 due to these connecting walls 52C, 52D. Namely, the impact absorbing portion 52 is structured by plural closed cross-sectional portions (the small spaces 56, 58, 60).

On the other hand, the impact absorbing portion 54 is provided so as to overlap the cross members 98, 100 (see FIG. 4) and 102 (see FIG. 4) that are provided at the upper portion 104 side of the peripheral wall 92 of the battery pack 26 as seen in a vehicle side view. The impact absorbing portion 54 has an upper wall 54A which spans substantially in the horizontal direction between the lower side inner wall portion 46B of the inner portion 45 and the outer wall portion 44A of the outer portion 44. This upper wall 54A is provided so as to overlap the upper wall portion 92C of the peripheral wall 92 of the battery pack 26 as seen in a vehicle side view.

Further, at the impact absorbing portion 54, a lower wall 54B that faces the upper wall 54A is formed at the lower side of the upper wall 54A. This lower wall 54B is provided so as to overlap the partitioning wall portion 92E of the peripheral wall 92 of the battery pack 26 as seen in a vehicle side view. Plural (here, three) connecting walls 54C, 54D, 54E span in the vertical direction between the upper wall 54A and the lower wall 54B of the impact absorbing portion 54. Small spaces 62, 64, 66, 68 are provided at the impact absorbing portion 54 by these connecting walls 54C, 54D, 54E. Namely, the impact absorbing portion 54 is structured by plural closed cross-sectional portions (the small spaces 62, 64, 66, 68).

The structure of the impact absorbing portion 78 that is provided at the lower portion 24A within the side door 24 is described in detail next.

The impact absorbing portion 78 is a closed cross-sectional structure and is formed in the shape of a ladder, and is provided so as to extend over substantially the entire region in the vehicle longitudinal direction of the side door 24. The impact absorbing portion 78 is provided so as to overlap the impact absorbing portions 52, 54 of the rocker 18 as seen in a vehicle side view. Here, the impact absorbing portion 78 is formed of a metal such as an aluminum alloy or the like for example, and is formed by extrusion or drawing or the like. Further, the impact absorbing portion 78 is joined to the door inner panel 72 side by an adhesive or the like for example. Note that the impact absorbing portion 78 may be formed integrally with the door inner panel 72.

The impact absorbing portion 78 is formed in a substantial upside-down L-shape as seen in a cross-section cut along the vehicle transverse direction. In detail, the impact absorbing portion 78 is formed along the shape of the door inner panel 72, and is structured to include an inner wall portion 78A that faces the inner wall portion 72B of the door inner panel 72, and an eaves lower wall portion 78B that is formed so as to face the eaves portion 72C. Moreover, the impact absorbing portion 78 is structured so as to further include an outer wall portion 78C that is formed substantially parallel to the inner wall portion 72B and is provided at the door outer panel 70 side, and an eaves upper wall portion 78D that is formed substantially parallel to the eaves lower wall portion 78B and is connected to the outer wall portion 78C.

An inclined lower wall portion 78E, which connects the lower end of the inner wall portion 78A and the lower end of the outer wall portion 78C, is formed at the impact absorbing portion 78. The inclined lower wall portion 78E is inclined toward the lower side while heading toward the vehicle transverse direction inner side, and is provided on an extension of the inclined lower wall portion 22C of the rocker 18.

Plural (here, three) connecting walls 78F, 78G; 78H span substantially in the horizontal direction between the outer wall portion 78C and the inner wall portion 78A of the impact absorbing portion 78. Due thereto, small spaces 80, 82, 84, 86 are provided at the impact absorbing portion 78. Namely, the impact absorbing portion 78 is structured by plural closed cross-sectional portions (the small spaces 80, 82, 84, 86).

Note that the connecting wall 78F of the impact absorbing portion 78 is set at a position that overlaps the upper wall 54A of the impact absorbing portion 54 of the rocker 18 as seen in a vehicle side view. The connecting wall 78G is set at a position that overlaps the lower wall 52B of the impact absorbing portion 52 of the rocker 18 as seen in a vehicle side view. Further, the connecting wall 78H of the impact absorbing portion 78 is set at a position that overlaps the upper wall 52A of the impact absorbing portion 52 of the rocker 18 as seen in a vehicle side view.

Operation and Effects of Vehicle Side Portion Structure

The operation and effects of the vehicle side portion structure relating to the present embodiment are described next.

In the present embodiment, as shown in FIG. 2, the closed cross-sectional portion 48 is formed at the rocker 18 of the vehicle side portion 16 when cut along the vehicle transverse direction. The impact absorbing portions 52, 54 are provided within this closed cross-sectional portion 48. Collision energy can be absorbed due to these impact absorbing portions 52, 54 plastically deforming at the time of a side collision of the vehicle 10. Further, the closed cross-sectional portion 76 is formed at the side door 24 of the vehicle side portion 16 when cut along the horizontal direction. At the lower portion 24A side of the side door 24, the impact absorbing portion 78 is provided within this closed cross-sectional portion 76. Collision energy can be absorbed due to this impact absorbing portion 78 plastically deforming at the time of a side collision of the vehicle 10.

As described above, in the present embodiment, the impact absorbing portions 52, 54 are provided within the rocker 18, and the impact absorbing portion 78 is provided within the lower portion 24A of the side door 24, respectively.

Figure 6A:
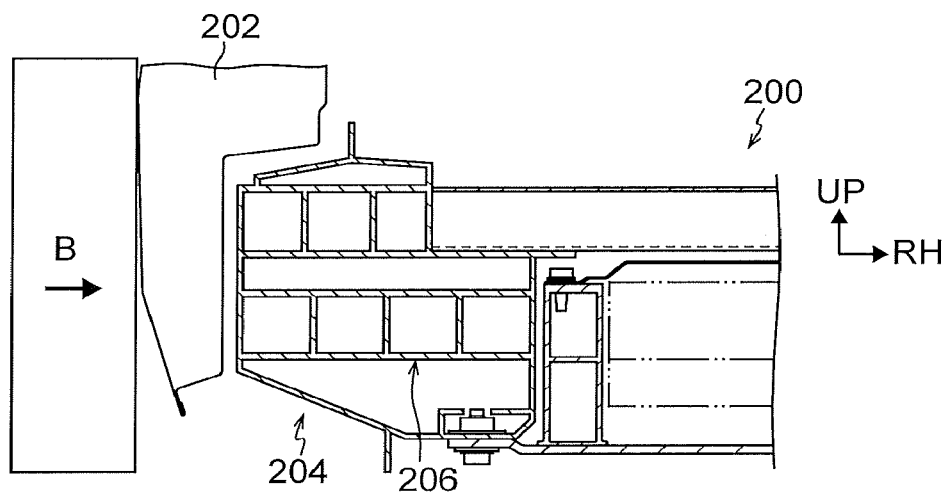
FIG. 6A is a cross-sectional view that corresponds to FIG. 5A and is for explaining, in a step-wise manner, a state of a side collision of a vehicle as a comparative example.
Figure 6B:
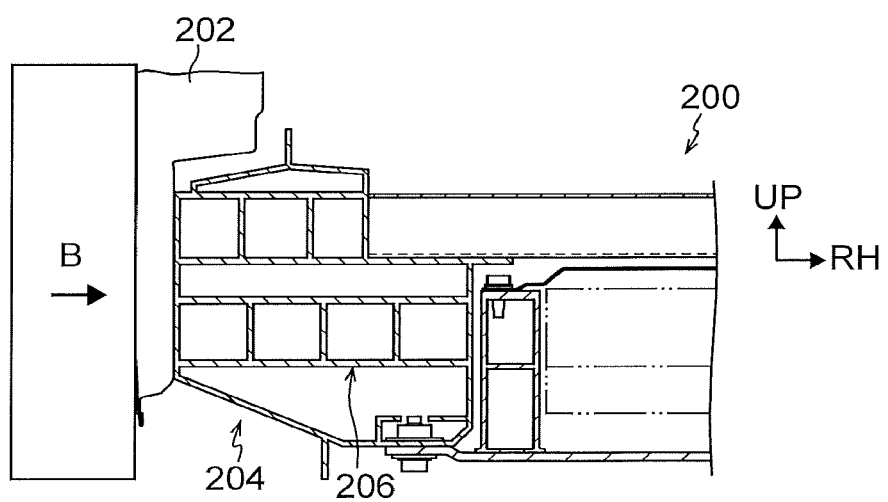
FIG. 6B is a cross-sectional view that corresponds to FIG. 5B and is for explaining, in a step-wise manner, a state of a side collision of a vehicle as a comparative example.

Here, as a comparative example, for example, a case is described in which an impact absorbing portion is not provided at a side door 202 side of a vehicle 200 as shown in FIG. 6A. In this case, at the time of a side collision of the vehicle 200, when barrier B collides with the side door 202 (in the direction of the arrow), as shown in FIG. 6B, the side door 202 deforms, but because an impact absorbing portion is not provided at the side door 202, an effect of absorbing the impact energy by an impact absorbing portion cannot be obtained.

Figure 6C:
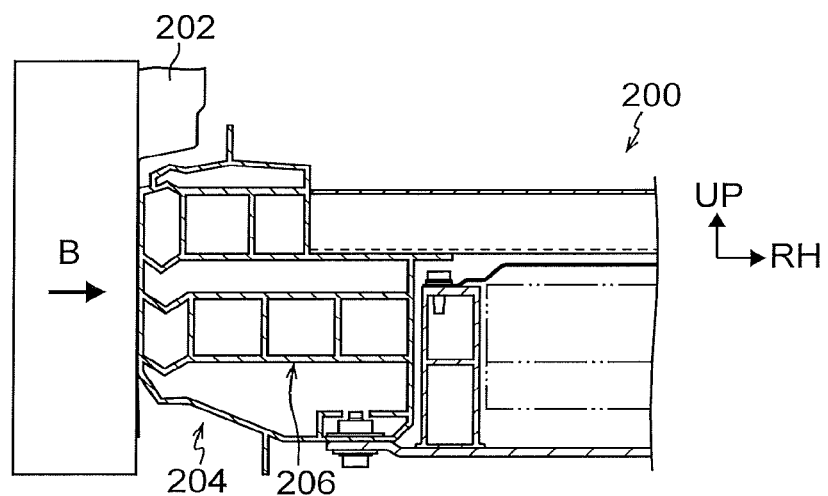
FIG. 6C is a cross-sectional view that corresponds to FIG. 5C and is for explaining, in a step-wise manner, a state of a side collision of a vehicle as a comparative example.

Further, as shown in FIG. 6C, when the barrier B collides with a rocker 204 via the side door 202, the rocker 204 and an impact absorbing portion 206 that is provided within the rocker 204 plastically deform. Due thereto, impact energy is absorbed, and the penetration speed at which the barrier B penetrates in toward the inner side in the vehicle transverse direction is slowed.

Namely, in the comparative example, during the time up until the barrier B collides with the rocker 204 via the side door 202, an effect of absorbing impact energy by an impact absorbing portion is not obtained. Therefore, this period of time is a so-called idle period of time, and the barrier B penetrates-in in the vehicle transverse direction by that much.

Figure 5A:
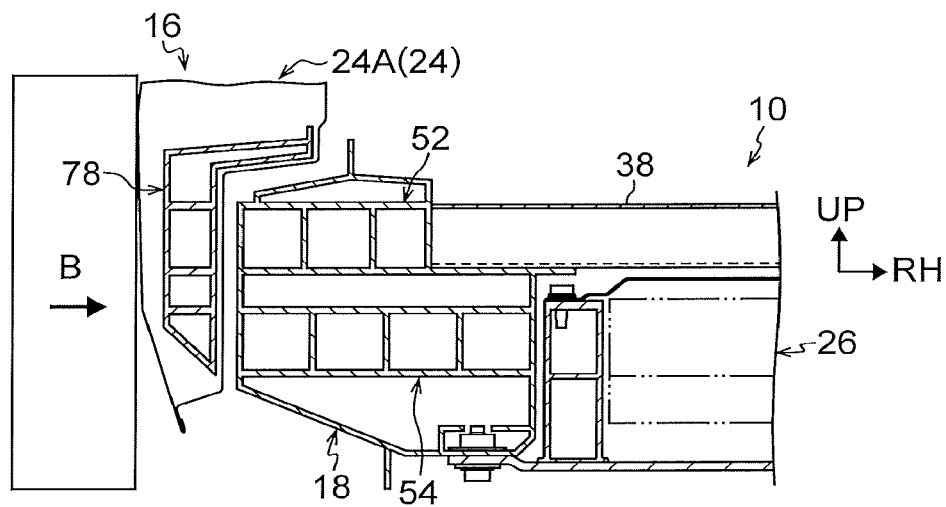
FIG. 5A through FIG. 5C are cross-sectional views for explaining, in a step-wise manner, states of a side collision of the vehicle to which the vehicle side portion structure relating to the present embodiment is applied.

In contrast, in the present embodiment, as shown in FIG. 5A, the impact absorbing portions 52, 54 are provided within the rocker 18, and the impact absorbing portion 78 is provided within the lower portion 24A of the side door 24, respectively.

Figure 5B:
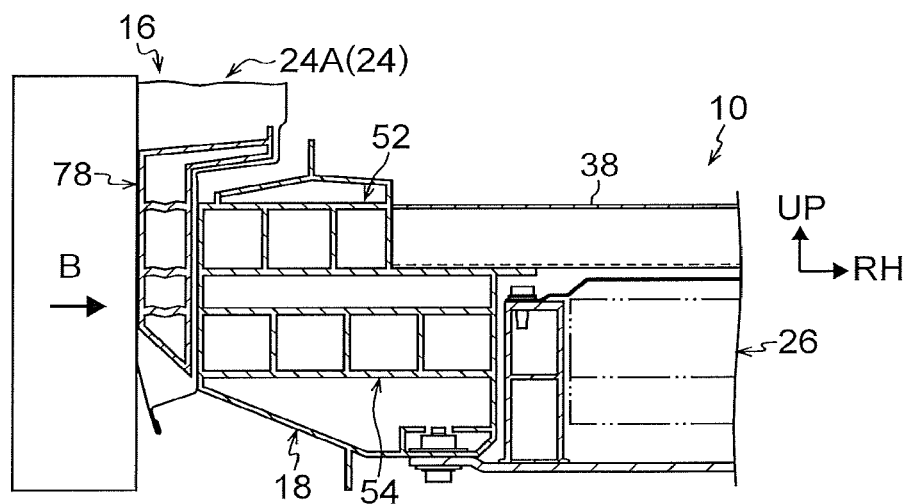

Therefore, at the time of a side collision of the vehicle 10, when the barrier B collides with the side door 24 (in the direction of the arrow), as shown in FIG. 5B, the impact absorbing portion 78 within the side door 24 plastically deforms, and collision energy is absorbed. Due thereto, the penetration speed at which the barrier B penetrates in toward the vehicle transverse direction inner side can be greatly slowed.

Figure 5C:
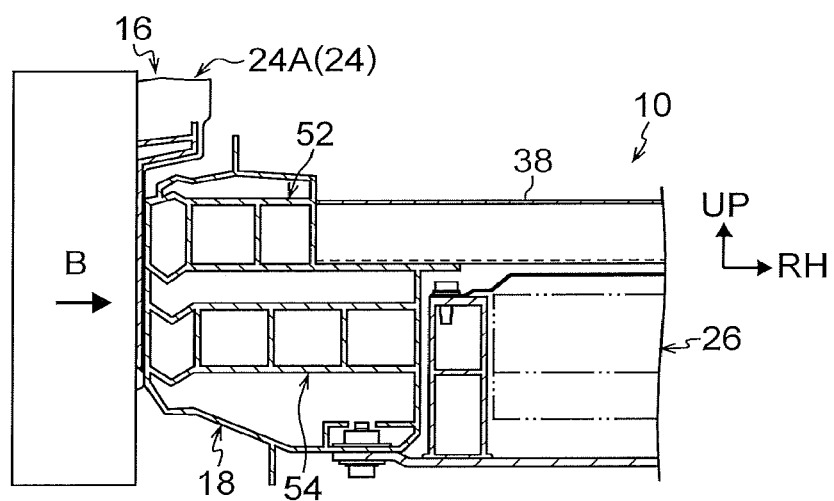

Moreover, as shown in FIG. 5C, when the barrier B collides with the rocker 18 via the side door 24, the rocker 18 and the impact absorbing portions 52, 54 that are provided within the rocker 18 plastically deform. Due thereto, impact energy is further absorbed, and the penetration speed at which the barrier B penetrates in toward the vehicle transverse direction inner side is slowed more.

Namely, in the present embodiment, as compared with the comparative example, at the time of a side collision of the vehicle 10, the amount of impact energy that is absorbed can be increased at the lower portion 24A of the side door 24. In accordance with the present embodiment, the amount of penetration of the barrier B penetrating in toward the vehicle transverse direction inner side can be greatly reduced.

Note that FIG. 5C is an explanatory drawing showing a state in which the rocker 18 and the impact absorbing portions 52, 54 are plastically deforming, and is not shown on the same time axis as FIG. 6C. Therefore, if FIG. 5C and FIG. 6C are illustrated on the same time axis, the position of the barrier B shown in FIG. 6C will be positioned at the left side in FIG. 5C.

Further, in the present embodiment, the impact absorbing portions 52, 54 that are provided within the rocker 18 respectively are closed cross-sectional structures and are formed in the shapes of ladders. The impact absorbing portion 78 that is provided at the lower portion 24A within the side door 24 is a closed cross-sectional structure and is formed in the shape of a ladder.

Due to the impact absorbing portions 52, 54, 78 respectively forming closed cross-sectional structures in this way, deformation of the impact absorbing portions 52, 54, 78 themselves is suppressed as compared with a case in which they are open cross-sectional structures. Therefore, collision load is transferred over the entireties of the impact absorbing portions 52, 54, 78, and impact energy, while the load is still high, can be absorbed at the entire impact absorbing portions 52, 54, 78. Namely, the amount of impact energy that is absorbed can be increased. In particular, in the present embodiment, the impact absorbing portions 52, 54, 78 are respectively formed in the shapes of ladders in which plural closed cross-sectional portions are formed in succession, and therefore, the collision load is dispersed, and the above-described effect can be improved further.

Further, in the present embodiment, as shown in FIG. 2, in a vehicle side view, the impact absorbing portion 78 that is within the side door 24 and the impact absorbing portions 52, 54 that are within the rocker 18 are provided so as to overlap. Therefore, at the time of a side collision of the vehicle 10, the impact energy is absorbed effectively in succession by the impact absorbing portion 78 that is within the side door 24 and the impact absorbing portions 52, 54 that are within the rocker 18. Accordingly, at the time of a side collision of the vehicle 10, the amount of penetration of the barrier B in toward the vehicle transverse direction inner side can be reduced, and, even if the stroke is short, the absorbed amount of impact energy can be ensured.

In particular, in the present embodiment, at the connecting walls 78F, 78G; 78H that span between the outer wall portion 78C and the inner wall portion 78A of the impact absorbing portion 78, as seen in a vehicle side view, the connecting wall 78F is set at a position that overlaps the upper wall 54A of the impact absorbing portion 54 of the rocker 18, and, as seen in a vehicle side view, the connecting wall 78G is set at a position that overlaps the lower wall 52B of the impact absorbing portion 52 of the rocker 18. Further, as seen in a vehicle side view, the connecting wall 78H of the impact absorbing portion 78 is set at a position that overlaps the upper wall 52A of the impact absorbing portion 52 of the rocker 18.

Namely, in the present embodiment, between the impact absorbing portion 78 that is within the side door 24 and the impact absorbing portions 52, 54 that are within the rocker 18, the horizontal walls (the connecting walls 78F, 78G, 78H) of the impact absorbing portion 78 and the horizontal walls (the upper wall 54A, the lower wall 52B, the upper wall 52A) of the impact absorbing portions 52, 54 within the rocker 18 are provided in succession along the vehicle transverse direction with the ridgelines 101A, 101B and 101C thereof being lined-up in a state of overlapping in the height direction.

Accordingly, in accordance with the present embodiment, at the time of a side collision of the vehicle 10, when collision load is inputted to the side door 24, and collision load is transmitted to the rocker 18, because the horizontal walls are continuous along the vehicle transverse direction, the collision load can be transmitted more effectively. Namely, at the time of a side collision of the vehicle 10, the side door 24 and the impact absorbing portion 78 are sufficiently plastically deformed, and the impact energy can be absorbed more effectively.

Further, in the present embodiment, as shown in FIG. 2, the upper wall 52A of the impact absorbing portion 52 is provided so as to overlap, for example, the upper wall 38B of the floor cross member 38 as seen in a vehicle side view. Because this floor cross member 38 spans between the rocker 18 and the rocker 18, at the time of a side collision of the vehicle 10, the rocker 18 can obtain reaction force from this floor cross member 38. Due thereto, penetration of the barrier B in toward the vehicle transverse direction inner side can be suppressed. Further, the rocker 18 and the impact absorbing portion 52 are sufficiently plastically deformed, and the impact energy can be absorbed effectively.

Note that the horizontal walls (the connecting walls 78F, 78G, 78H) of the impact absorbing portion 78 within the side door 24, and the horizontal walls (the upper wall 54A, the lower wall 52B, the upper wall 52A) of the impact absorbing portions 52, 54 within the rocker 18, do not necessarily have to be made continuous along the vehicle transverse direction.

Moreover, in the present embodiment, as shown in FIG. 2, the battery pack 26 is installed at the vehicle lower side of the floor panel 14. As shown in FIG. 4, the cross members 98, 100, 102 span between the side wall portions 92S of the peripheral wall 92 which face one another in the vehicle transverse direction at the battery pack 26. Due thereto, the rigidity of the battery pack 26 itself can be improved as compared with a case in which these cross members 98, 100, 102 are not provided.

Further, as shown in FIG. 2, the impact absorbing portion 78 that is within the side door 24 and the impact absorbing portion 54 that is within the rocker 18 are provided so as to overlap the cross members 98, 100 (see FIG. 4) and 102 (see FIG. 4) as seen in a vehicle side view.

Generally, the battery pack 26 is set to have high rigidity and high strength. Therefore, as described above, by providing the impact absorbing portion 78 that is within the side door 24 and the impact absorbing portion 54 that is within the rocker 18 so as to overlap the cross members 98, 100, 102 as seen in a vehicle side view, reaction force can be obtained from the battery pack 26 at the time of a side collision of the vehicle 10. Due thereto, at the time of a side collision of the vehicle 10, penetration of the barrier B in toward the vehicle transverse direction inner side can be suppressed, and further, impact energy can be absorbed effectively at the impact absorbing portion 78 and the impact absorbing portion 54.

In particular, the upper wall 54A of the impact absorbing portion 54 that is within the rocker 18 is provided so as to overlap the upper wall portion 92C of the peripheral wall 92 of the battery pack 26 as seen in a vehicle side view. The lower wall 54B of the impact absorbing portion 54 that is within the rocker 18 is provided so as to overlap the partitioning wall portion 92E of the peripheral wall 92 of the battery pack 26 as seen in a vehicle side view.

Namely, in the present embodiment, the horizontal walls (the upper wall 54A, the lower wall 54B) of the impact absorbing portion 54 that is within the rocker 18, and the horizontal walls (the peripheral wall 92, the partitioning wall portion 92E) of the peripheral wall 92 of the battery pack 26, are provided in succession along the vehicle transverse direction with the ridgelines thereof being lined-up in a state of overlapping in the height direction.

Accordingly, in accordance with the present embodiment, at the time of a side collision of the vehicle 10, when collision load is transferred from the rocker 18 to the battery pack 26, because the horizontal walls are continuous along the vehicle transverse direction, reaction force from the battery pack 26 is obtained more effectively, and the rocker 18 and the impact absorbing portion 54 are sufficiently plastically deformed, and the impact energy can be absorbed more effectively.

Note that the horizontal walls (the upper wall 54A, the lower wall 54B) of the impact absorbing portion 54 within the rocker 18, and the horizontal walls (the peripheral wall 92, the partitioning wall portion 92E) of the peripheral wall 92 of the battery pack 26, do not necessarily have to be made continuous along the vehicle transverse direction.

Still further, in the present embodiment, the impact absorbing portion 78 is provided at the lower side of the door opening portion 22, and faces the rocker 18 that is disposed at the lower side of the door opening portion 22, and, as seen in a vehicle side view, overlaps the outer portion 44 of the rocker 18. Further, the impact absorbing portion 78 is formed in a substantial upside-down L-shape as seen in a cross-section cut along the vehicle transverse direction, and, together with the door inner panel 72 of the side door 24, is formed along the shape of the outer portion 44 of the rocker 18.

Therefore, at the time of a side collision of the vehicle 10, in the state in which the impact absorbing portion 78 hits the rocker 18 via the door inner panel 72, the impact absorbing portion 78 overlaps along the shape of the outer portion 44 of the rocker 18. Namely, the impact absorbing portion 78 moving in the vehicle transverse direction is restricted by the outer portion 44 of the rocker 18. Accordingly, in the present embodiment, at the time of a side collision of the vehicle 10, the lower end portion of the side door 24 passing-through the door opening portion 22 and penetrating into the vehicle cabin 12 interior, i.e., so-called slipping-through of the side door 24, can be suppressed.

Supplementary Description of Present Embodiment

In the present embodiment, as shown in FIG. 2, in a vehicle side view, the impact absorbing portion 78 that is within the side door 24 and the impact absorbing portions 52, 54 that are within the rocker 18 are provided so as to overlap, but do not necessarily have to overlap as seen in a vehicle side view.

Further, in the present embodiment, the impact absorbing portion 52 that is within the rocker 18 is provided so as to overlap the floor cross member 38 as seen in a vehicle side view, but does not necessarily have to overlap as seen in a vehicle side view.

Moreover, in the present embodiment, the impact absorbing portion 54 that is within the rocker 18 is provided so as to overlap the battery pack 26 as seen in a vehicle side view, but does not necessarily have to overlap as seen in a vehicle side view.

Further, in the present embodiment, the impact absorbing portion 78 is provided at the lower side of the door opening portion 22, but is not limited to only the lower side of the door opening portion 22.

On the other hand, the present embodiment describes, as an example, a case in which the side collision of the vehicle 10 is a side collision with a barrier. However, effects that are substantially the same as the effects that are due to the present embodiment can be achieved even in the case of a side collision with a pole.

Although an example of an embodiment has been described above, embodiments are not limited to the above, and the embodiment and various types of modified examples may be used by being combined together appropriately, and can be implemented in various forms within a scope that does not depart from the gist thereof.

What is claimed is:

1. A vehicle side portion structure comprising:

a pair of rockers that, at vehicle side portions, respectively extend along a vehicle longitudinal direction at both outer sides in a vehicle transverse direction of a floor panel that is a floor portion of a vehicle cabin interior, first impact absorbing portions that form closed cross-sectional structures and that, at a time of a side collision of a vehicle, plastically deform and absorb collision energy, being provided at interiors of the pair of rockers; and side doors that open and close door opening portions of the vehicle side portions, second impact absorbing portions, which form closed cross-sectional structures and, at the time of a side collision of the vehicle, plastically deform and absorb collision energy, being provided at lower portions of interiors of the side doors, wherein, in a vehicle side view, the first impact absorbing portions and the second impact absorbing portions are provided so as to overlap with one another, wherein each first impact absorbing portion includes a first upper wall, a first lower wall, and first connecting walls that respectively connect the first upper wall and the first lower wall, the first upper wall, the first lower wall and the first connecting walls forming first small spaces, wherein each second impact absorbing portion includes a second inner wall, a second outer wall, and second connecting walls that respectively connect the second inner wall and the second outer wall, the second inner wall, the second outer wall and the second connecting walls forming second small spaces, and wherein the second connecting walls, the first upper walls and one of the first lower walls extend in the vehicle transverse direction and are provided in succession along the vehicle transverse direction, with ridgelines of the second connecting walls being lined-up in a state of overlapping in a vehicle height direction, and with ridgelines of the first upper walls and one of the first lower walls being lined-up in a state of overlapping in the vehicle height direction.

2. The vehicle side portion structure of claim 1, wherein:

a battery pack is installed at a vehicle lower side of the floor panel, and the first impact absorbing portions and the second impact absorbing portions are provided so as to, in a vehicle side view, overlap with a cross member that spans between peripheral walls that face one another in the vehicle transverse direction at the battery pack.

3. The vehicle side portion structure of claim 1, wherein the first impact absorbing portions and the second impact absorbing portions are provided so as to, in a vehicle side view, overlap with a floor cross member that is provided on the floor panel and that spans between the rockers that face one another.

4. The vehicle side portion structure of claim 1, wherein the second impact absorbing portions are provided at lower sides of the door opening portions.

* * * * *